Sept. 23, 1952 W. C. KELLEY ET AL 2,611,588
MIXER FOR FROZEN DESSERTS
Filed Nov. 2, 1951 2 SHEETS—SHEET 1
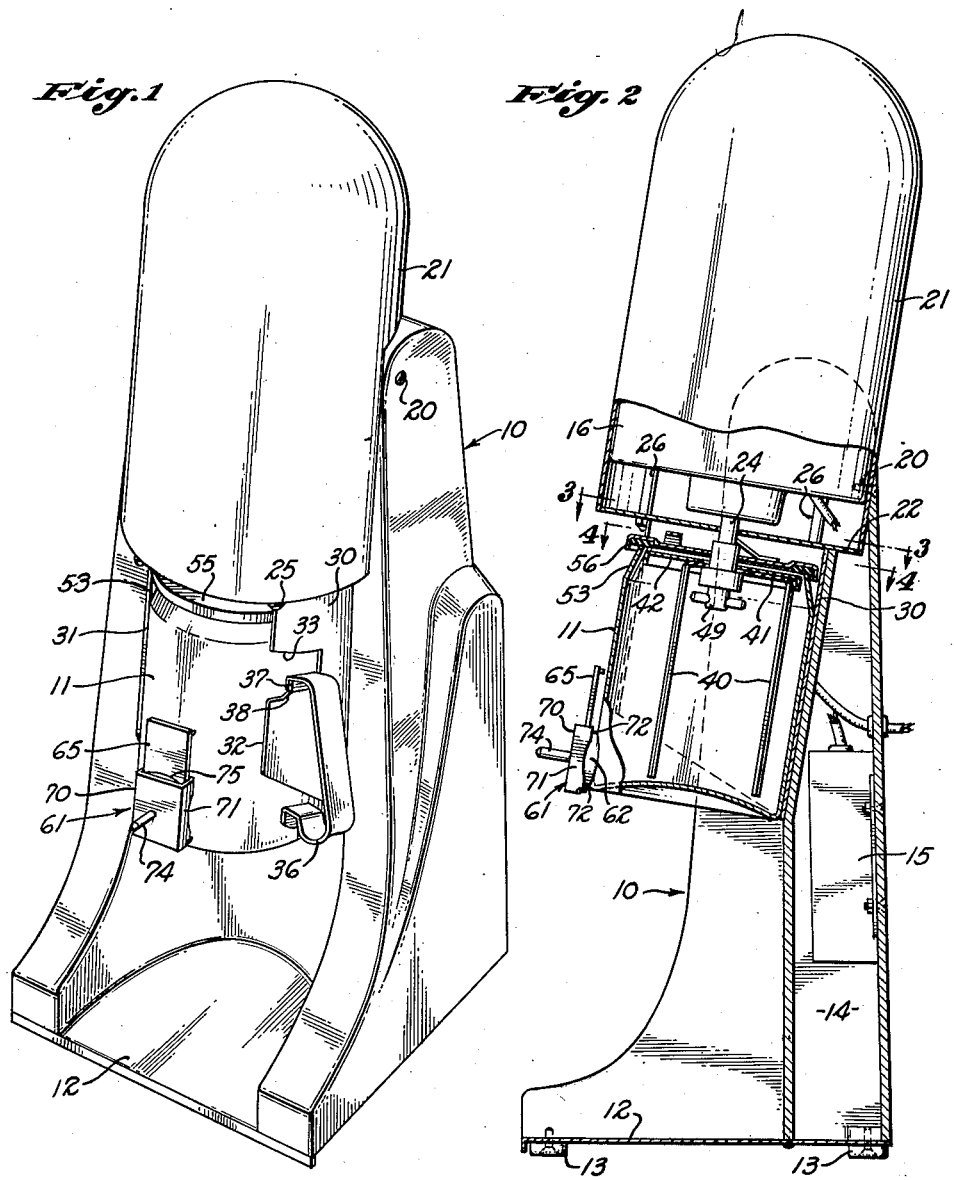
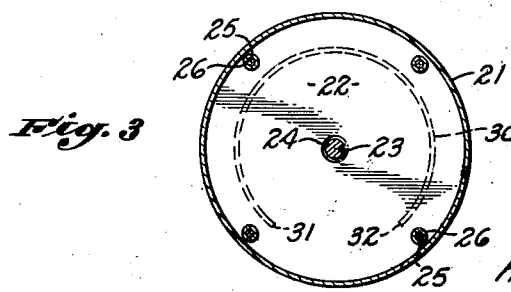
INVENTORS:
WALTER C. KELLEY
HERBERT C. PHILLIPS
BY THEIR ATTORNEYS
HARRIS, KIECH, FOSTER & HARRIS

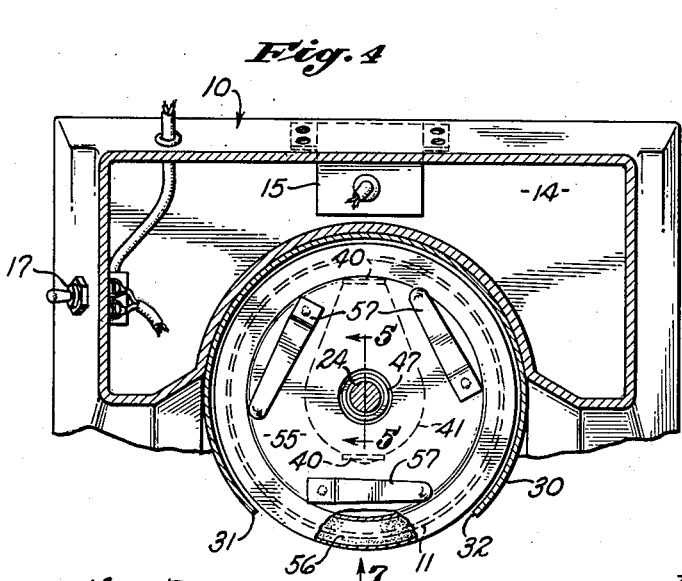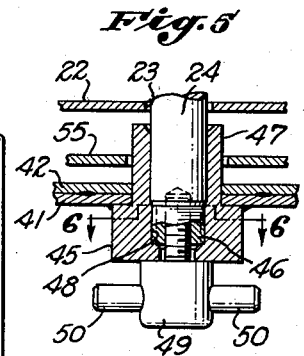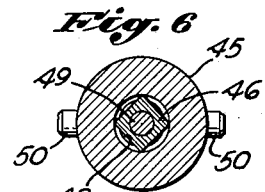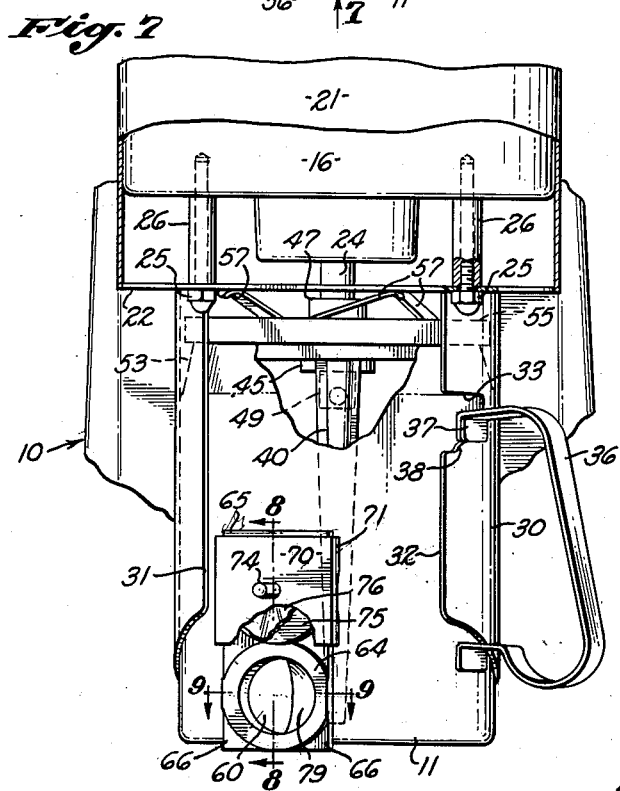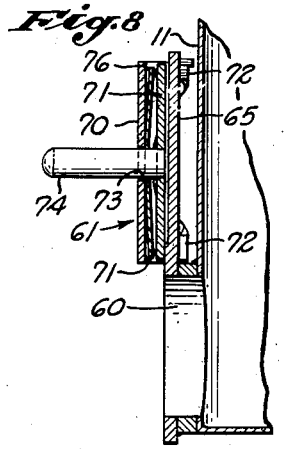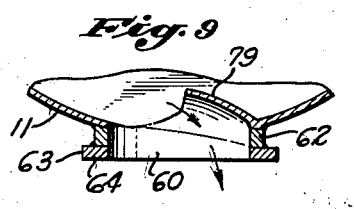
INVENTORS:
WALTER C. KELLEY
HERBERT C. PHILLIPS
BY THEIR ATTORNEYS
HARRIS, KIECH, FOSTER & HARRIS Patented Sept. 23, 1952

2,611,588

UNITED STATES PATENT OFFICE 2,611,588

MIXER FOR FROZEN DESSERTS

Walter C. Kelley and Herbert C. Phillips, Los Angeles, Calif., assignors to Minick's Ice Cream Co., Inc., Los Angeles, Calif., a corporation of California Application November 2, 1951, Serial No. 254,462

9 Claims. (Cl. 259—44)

This invention relates to mixing devices with special reference to electrically actuated devices for processing ice cream or mixing ice cream with milk and other ingredients to produce so-called "soft" ice cream, milk shakes, frappes and the like. Usually ice cream is frozen hard and requires vigorous processing to produce a blended product of the desired fluid or semifluid character within a reasonably short processing period.

One object of the invention is to provide a rugged and efficient device of this character that will require minimum time, minimum effort and minimum manipulation on the part of the operator. In this regard one of the features of the invention is the provision of a mixing container with a valve-controlled dispensing port so arranged that the agitator promotes rapid dispensing flow therethrough. With such an arrangement the operator may dispense a serving of the ice cream product without removing the container from the machine, and moreover, may dispense the serving in a neat and expeditious manner in contrast to the usual messy procedure of pouring the blended product from one container into another.

A special advantage resides in the use of a mixing container of ample size from which several small servings, such as a la mode servings and one-cup servings, may be dispensed over a period of time. A plurality of interchangeable mixing containers kept in refrigeration solves the problem of handling different flavors and different products with the one mixing apparatus.

Another important object of the invention is to provide free accessibility to all surfaces of the device that are subject to contact by the food product. A feature of the invention is that all parts subject to such contact are quickly removable from the device for cleaning. The mixing container and the mechanical agitator as well as an automatic cover mounted in the apparatus to close the container, are quickly and conveniently removable. In addition, other parts of the apparatus having surfaces adjacent the container and automatic cover are arranged for removal as desired.

A further object of the invention is to provide a quickly attachable and detachable mixing container having a dispensing valve that is simple in construction, easy to operate, and is readily dismantled for cleaning.

The foregoing and other objects and advantages of the invention will be apparent in the following detailed description taken with the accompanying drawings.

In the drawings, which are to be regarded as merely illustrative:

Fig. 1 is a perspective view of our approved mixing machine, showing the mixing container in place therein;

Fig. 2 is a view partly in side elevation and partly in vertical section;

Fig. 3 is a transverse section taken as indicated by the line 3—3 of Fig. 2;

Fig. 4 is a transverse section taken as indicated by the line 4—4 of Fig. 2;

Fig. 5 is a fragmentary section taken as indicated by the line 5—5 of Fig. 4;

Fig. 6 is a section taken as indicated by the broken line 6—6 of Fig. 5;

Fig. 7 is a side elevation of the mounted mixing cup and associated parts of the apparatus taken from the viewpoint indicated by the arrow 7 in Fig. 4;

Fig. 8 is a section through the dispensing valve of the mixing container taken as indicated by the line 8—8 of Fig. 7; and Fig. 9 is a transverse section of the dispensing port of the mixing container taken as indicated by the line 9—9 of Fig. 7.

The presently preferred embodiment of the invention shown in the drawings includes an ornamental supporting standard generally designated 10. The standard 10 is hollow from the front, being U-shaped in horizontal cross section, to receive a removable mixing cup or container 11. In the construction shown, the cavity or recess formed by the hollow configuration of the standard 10 is closed at the bottom by a plate 12, and the standard is provided with resilient pads 13 to absorb vibration as well as to prevent marring of any surface on which the standard may be placed. Preferably the standard 10 is of hollow construction thus providing a rear compartment 14 in which may be concealed a choke coil 15 or other accessory device for a mixing motor 16. A suitable switch 17 (Fig. 4) to control the motor may be mounted on one side of the standard 10.

The mixing motor 16 is mounted on the upper end of the standard 10 by suitable screws 20 and preferably is slightly tilted rearwardly as may be seen in Fig. 2. The motor 16 is preferably encased in a cylindrical housing 21 that is closed and dome-shaped at its upper end and is closed at its lower end by a cross plate 22. As shown in Figs. 2 and 3, the cross plate 22 has a central aperture 23 to clear the downwardly extending shaft 24 of the motor 16. In the particular construction shown the cross plate 22 is mounted by easily removable screws 25 on the ends of four posts 26 that extend downwardly from the motor 16.

Unitary with the cross plate 22 and depending therefrom is a cylindrically curved metal wall constituting what may be termed a cylindrical casing 30 for cooperation with the removable container 11. It is contemplated that the casing 30 will be adapted to releasably interlock with the mixing container 11, preferably with a cam action to cause the container 11 to shift upward slightly as the mixing container is moved into its mounted position. For this purpose the casing 30 is cut away at the front to provide a relatively wide slot extending upward from the bottom of the casing, the slot having two side edges 31 and 32 respectively. As best shown in Figs. 1 and 2, the right-hand edge 32 of this wide slot is cut away to form a narrower transverse slot 33, the two slots forming what may be termed a bayonet slot for retaining the mixing cup 11.

For cooperation with the bayonet slot of the casing 30 the container 11 has a side handle 36, the upper end of which is turned downward on the surface of the container to form a rounded projection or lug 37 adapted to ride on the lower edge of a transverse slot 33. It is apparent that the cup may be mounted in the casing 30 by entering the cup into the casing from below with the handle 36 passing upward through the wide casing slot. The cup is then rotated to bring the rounded lug 37 into the transverse slot 33 whereupon the rounded lug rides up a cam shoulder or incline 38 formed in the lower edge of the transverse slot for the purpose of giving the mixing container the desired final upward shift.

Removably mounted on the end of the downwardly extending motor shaft 24 is a suitable agitator assembly which may include a pair of fingers 40 that are interconnected at their upper ends by a metal web 41 made in one piece therewith. In the construction shown the metal web 41 is welded to the underside of a flanged circular plate 42 with the two downwardly extending fingers 40 at different radial distances from the axis of the motor shaft 24. Both the web 41 and the flanged plate 42 are rigidly mounted on what may be termed a hub member 45 by means of which the agitator may be releasably assembled to the motor shaft.

As best shown in Figs. 5 and 6, the motor shaft 24 terminates in a square end portion 46 and the hub member 45 of the agitator is formed with a cylindrical wall 47 to surround the cylindrical part of the shaft and is further provided with a noncircular well 48 to receive and engage the square end 46 of the motor shaft. The hub member 45 is releasably held in place on the end of the motor shaft by suitable manually operable means such as a screw 49 threaded into the end of the shaft through the hub member. The screw 49 is adapted for convenient manual manipulation, for example, by being equipped with a short cross rod 50, the two ends of which serve as finger pieces.

The upper edge of the mixing container or cup 11 is turned inward as indicated at 53 in Figs. 1 and 2 to form a rim that is of reduced diameter but larger in diameter than the flanged circular plate 42. Thus the mixing container is dimensioned to move upward sufficiently to enclose the flanged circular plate 42 as well as the two agitator fingers 40 depending therefrom. What may be termed a floating cover 55 for the mixing container 11 is provided between the flanged circular plate 42 and the previously mentioned cross plate 22 that closes the lower end of the motor housing 21. In the construction shown the floating cover 55 is centrally apertured to clear the cylindrical wall 47 of the hub member 45 and is flanged around its circular rim to retain a suitable sealing ring or gasket 56 for pressure contact with the rim of the container 11.

It is contemplated that suitable resilient means will be provided to urge the floating cover 55 downward toward the flanged circular plate 42 of the agitator assembly but that the upward shift of the container by virtue of the cam action as the container lug 37 rides up the cam shoulder 38 will cause the rim of the mixing container to lift the floating cover 55 upward clear of the agitator assembly. The resilient means required for this purpose may comprise, for example, a plurality of leaf springs 57, preferably three, which are mounted on the upper side of the floating cover 45 and are inclined upward into pressure contact with the under face of the cross plate 22. Thus the leaf springs 57 urge the floating cover 55 downward against the agitator assembly in the absence of the mixing container 11 but mounting the mixing container in the casing 30 by means of the bayonet slot causes the floating cover to be lifted free from the rotating agitator assembly. At the same time adequate sealing pressure is created between the floating cover and the rim of the container.

As heretofore indicated, the mixing container 11 is preferably provided with a dispensing port 60 that is normally closed by a suitable manually operated valve generally designated 61. In the construction shown the dispensing port 60 is formed by a narrow circular wall 62 having an outer flange 63 providing a smooth face 64 for cooperation with the valve 61. Mounted on the outside of the container is a valve guideway that includes the outer flange 63 of the dispensing port, a guide plate 65 extending upward from the flange 63 and two lower corner guide plates 66 (Fig. 7).

The valve 61 includes a sheet metal slide 70 having two side walls 71 to slidingly engage the side edges of the guideway, the two side walls 71 having inwardly turned flanges 72 (Fig. 8) to slidingly engage the inner face of the guideway. The slide 70 has a central aperture 73 to clear the stem 74 of a valve member 75. Suitable resilient means such as a leaf spring 76 acts under stress between the valve member 75 and the slide 70 to continually urge the valve member 75 inward toward the container 11.

The valve 61 is shown in open position in Figs. 7 and 8 with the slide 70 shifted upward away from the dispensing port 60. It will be noted that the leaf spring 76 in pressing the valve member 75 against the outer face of the guideway also causes the flanges 72 of the slide to press outward against the inner face of the guideway. Thus the guideway is in effect clamped between the valve member 75 and the flanges 72.

The stem 74 of the valve member 75 serves as a convenient finger piece by means of which the slide 70 may be shifted between an upper position and a lower position for closing the dispensing port 60. If desirable the operator may pull outward slightly on the stem 74 to reduce the frictional contact between the valve member 75 and the guideway when moving the slide 70 downward. At the lower closed position of the valve, the valve member 75 rests in pressure contact against the smooth face 64 of the dispensing port flange 63 thus effectively closing the dispensing port 60.

One of the features of this particular form of the mixing container is the provision of simple means for deflecting the content of the container toward the dispensing port 60 as the content is rotated by the two fingers 40. As shown in Fig. 9 a deflecting baffle for this purpose may be provided by extending a portion 79 of the wall of the container across the dispensing port and turning this portion inwardly to form a lip or baffle as shown in Fig. 9. The effect of the baffle 79 is to divert the rotating material outward through the port as indicated by the arrows in Fig. 9.

The manner in which the described apparatus is utilized and operated will be readily apparent from the foregoing description. A container 11 is easily and quickly mounted in the casing 30 by virtue of the bayonet slot in the casing and the coacting lug portion of the container handle. As heretofore explained, the act of mounting the container automatically brings the floating cover 55 into pressure contact with the rim of the container with the floating cover elevated to clear the agitator assembly.

When the motor switch is closed with ice cream or an ice cream mixture in the container 11, the agitator fingers 40 will rotate slowly at first if the ice cream is extremely cold and hard but will pick up speed to break down the crystals progressively. Any tendency for the material to spin or turn in the container to any substantial extent while it is in solid state will be limited because as soon as the hard mass starts to turn it refreezes to the container. As the viscosity of the mix decreases, the speed of the motor progressively increases with the resultant beating of air into the mix. Even ice cream as cold as −20° F. can be creamed in no more than 3 minutes.

If it is desired to serve the finished product directly from the container without removing the container from the apparatus, it is merely necessary to open the valve 61 by shifting the stem 74 upward to open the dispensing port 60. By permitting the motor to run while the valve 61 is open the operator saves time inasmuch as the rotating agitator causes a steady flow of the material through the dispensing port by virtue of the deflecting baffle 79. If a number of partially filled containers 11 are kept in refrigeration, servings may be made from a container apart from the apparatus if desired. On the other hand, a container from which a serving is to be made may be remounted in the apparatus and the motor started for the dual purpose of again agitating the material and then dispensing the material through the dispensing port.

It is a very simple matter to loosen the screw 49 by hand to remove the complete agitator assembly along with the floating cover for cleaning whenever desired. Periodically, the four screws 25 may be loosened to remove the casing 30 along with the cross plate 22 to which it is attached. Thus all of the surfaces of the apparatus that can possibly receive particles or deposits of the food products are readily accessible for thorough cleaning. The container 11 is easily cleaned and it is to be noted that the valve 61 on the side of the container may be removed simply by shifting the slide 70 upward from the upper end of the guide plate 65.

Our description in detail of a preferred practice of our invention, by way of example and to illustrate the principles involved, will suggest to those skilled in the art various changes, substitutions and other departures from our disclosure that properly lie within the spirit and scope of the appended claims.

We claim as our invention:

1. In an apparatus of the character described having a motor mounted on a standard with the drive shaft of the motor directed downward, the combination therewith of: a container for material to be processed; means to releasably support said container in an operating position under said motor; agitator means adapted for mounting on said shaft to process material in said container; a cover for said container, said cover having a central aperture to surround said shaft; yielding means to urge said cover downward against said agitator means in the absence of said container, said support means positioning said container at sufficient elevation for contact with said cover and to lift said cover above said agitator means; and manually operable means to releasably hold said agitator means on said shaft whereby releasing said manually operable means releases both said agitator and said cover for removal from the apparatus.

2. In an apparatus of the character described having a motor mounted on a standard with the drive shaft of the motor directed downwardly, the combination therewith of: a transverse wall removably mounted under said motor with an aperture therein to clear the motor shaft; a container for material to be processed by the apparatus; means to releasably support said container in an operative position under said motor; agitator means for mounting on said shaft to extend downwardly therefrom into said container, said agitator means extending radially from the axis of said shaft and having an upwardly extending hub to embrace the shaft; a cover for said container having a central aperture surrounding said hub; yielding means in stress between said cover and said transverse wall to urge said cover downward against said agitator in the absence of said container and against the rim of the container when the container is in its operating position; and manually operable means to releasably hold said agitator means on said shaft whereby releasing said manually operable means releases both said agitator and said cover for removal from the apparatus.

3. An apparatus as set forth in claim 2 in which said manually operable means has screw threads engaging said shaft and has lateral extensions to serve as finger pieces for facilitating removal of the manually operable means.

4. In an apparatus of the character described having a motor mounted on a standard with the drive shaft of the motor directed downward, the combination therewith of: an agitator mounted on said drive shaft to extend downward therefrom; a container for material to be processed by said agitator, said container having a port in the side thereof near its bottom for dispensing material therefrom, a portion of the wall of said container extending partially across said port in a direction opposite from the rotation of said agitator and being turned inward from the port to deflect rotating material out through the port; manually operable valve means to control flow through said port; and means to releasably support said container in position for processing of its content by said agitator.

5. An apparatus as set forth in claim 4 in which said valve means comprises an external guideway on said container and a slide mounted on said guideway carrying a valve member to close said port.

6. An apparatus as set forth in claim 5 which includes yielding means in stress between said slide and said valve member to urge the valve member toward said port.

7. An apparatus as set forth in claim 6 in which said guideway includes a flat plate spaced outward from the wall of the container and in which said slide has side walls in contact with the side edges of the guideway and has inwardly turned flanges for contact with the rear side of the guideway.

8. An apparatus as set forth in claim 6 in which said valve member has a stem extending outwardly therefrom through an aperture in said slide for the dual purpose of manually moving the slide on said guideway and manually moving said valve member outward.

9. An apparatus as set forth in claim 2 in which said yielding means is carried by said cover for compression between the cover and said transverse wall whereby releasing said manually operable means permits removal not only of the agitator and the cover but also removal of the yielding means with the cover so that the yielding means may be cleaned apart from the apparatus and so that said transverse wall will be freely accessible for cleaning without hindrance by the yielding means.

WALTER C. KELLEY.
HERBERT C. PHILLIPS.

REFERENCES CITED

The following references are of record in the file of this patent:

UNITED STATES PATENTS

| Number | Name | Date |
|---|---|---|
| 1,109,144 | Perkins | Sept. 1, 1914 |
| 1,650,256 | Beach | Nov. 22, 1927 |
| 1,711,407 | Flegel | Apr. 30, 1929 |
| 2,078,190 | Bemis | Apr. 20, 1937 |
| 2,109,501 | Osius | Mar. 1, 1938 |
| 2,207,884 | Holmen | July 16, 1940 |
| 2,510,934 | Schildknecht | July 6, 1950 |